United States Patent [19]

Nagai et al.

[11] Patent Number: 4,561,988

[45] Date of Patent: Dec. 31, 1985

[54] PROCESS FOR PRODUCTION OF PLATE-LIKE BARIUM FERRITE PARTICLES FOR MAGNETIC RECORDING

[75] Inventors: Norimichi Nagai; Nanao Horiishi, both of Hiroshima; Masao Kiyama; Toshio Takada, both of Kyoto, all of Japan

[73] Assignee: Toda Kogyo Corporation, Hiroshima, Japan

[21] Appl. No.: 666,337

[22] Filed: Oct. 30, 1984

[30] Foreign Application Priority Data

Oct. 31, 1983 [JP] Japan ............................ 58-204317

[51] Int. Cl.$^4$ ............................................. C04B 35/26
[52] U.S. Cl. ................................ 252/62.59; 252/62.63
[58] Field of Search ........................... 252/62.59, 62.63

[56] References Cited

U.S. PATENT DOCUMENTS

| | | | |
|---|---|---|---|
| 4,341,648 | 7/1982 | Kubo et al. | 252/62.59 X |
| 4,414,124 | 11/1983 | Endo et al. | 252/62.59 X |
| 4,425,250 | 1/1984 | Hibst | 252/62.59 |
| 4,529,524 | 7/1985 | Nagai et al. | 252/62.59 |

FOREIGN PATENT DOCUMENTS

| | | | |
|---|---|---|---|
| 39773 | 11/1981 | European Pat. Off. | 252/62.63 |
| 102819 | 3/1984 | European Pat. Off. | 252/62.63 |
| 58-56302 | 4/1983 | Japan | 252/62.59 |

OTHER PUBLICATIONS

"Chem. Abstracts", vol. 97, No. 8, 65339q.
"Chem. Abstracts", vol. 97, No. 4, 32544z.
Kubo et al., "IEEE Transactions on Magnetics", vol. 18, No. 6, 11/82, pp. 1122-1124.

*Primary Examiner*—Jack Cooper
*Attorney, Agent, or Firm*—Cushman, Darby & Cushman

[57] ABSTRACT

Disclosed herein is a process for producing the plate-like barium ferrite particles represented by the formula (I):

$$BaFe_{12-x-y}M_xTi_yO_{19} \qquad (I)$$

wherein x and y are respectively 0.3 to 1.2 and M is a divalent metal selected from the group consisting of Co, Ni, Zn and Mn, which comprises autoclaving an aqueous highly alkaline suspension containing spinel particles represented by the formula: $Fe_{12-x-y}M_xTi_yO_{16}$, wherein x, y and M are respectively the same as defined above, having an average particle size of less than 0.1 $\mu$m and Ba ions at a temperature of 250° to 330° C., the atomic ratio of Ba to total amount of the metals being in a range from 1:8 to 1:10.

3 Claims, No Drawings

PROCESS FOR PRODUCTION OF PLATE-LIKE BARIUM FERRITE PARTICLES FOR MAGNETIC RECORDING

BACKGROUND OF THE INVENTION

The present invention relates to a process for producing plate-like barium ferrite particles by substituting a part of Fe(III) of the plate-like barium ferrite particles with Ti(IV) and a divalent metal selected from the group consisting of Co, Ni, Zn and Mn. More in detail, the present invention relates to a process for producing plate-like barium ferrite particles represented by the formula(I):

$$BaFe_{12-x-y}M_xTi_yO_{19} \quad (I)$$

wherein x and y are respectively 0.3 to 1.2 and M is a divalent metal selected from the group consisting of Co, Ni, Zn and Mn for magnetic recording, which comprises autoclaving an aqueous highly alkaline suspension containing particles represented by the formula: $Fe_{12-x-y}M_xTi_yO_{16}$, wherein x, y and M are respectively the same as defined above, having a spinel crystalline structure and an average particle size of less than 0.1 μm and Ba ions at a temperature in the range of from 250° to 330° C. so that the atomic ratio of Ba to total amount of the metals is in a range of from 1:8 to 1:10.

In recent years, accompanying with the propagation of VTR, audio component, word processer and computer, non-acicular ferromagnetic particles of a favorable dispersibility provided with a suitable coercive force(Hc) have been required as the magnetic material for recording, particularly as the magnetic material for the perpendicular magnetic recording.

In general, as the ferromagnetic non-acicular particles, barium ferrite particles have been well known. However, the coercive force of barium ferrite particles obtained by the dry method is ordinarily larger than 3,000 Oe, and because of such a high coercive force, barium ferrite particles are not favorable as a magnetic material for magnetic recording.

Accordingly, in order to reduce the coercive force of the barium ferrite particles, various methods are proposed. For instance, it has been known for a long time that a part of Fe(III) in the barium ferrite particles is substituted by a divalent metal such as Co(II) and Ti(IV).

Further, it is necessary that the value of magnetization of the magnetic particles is as large as possible, and its necessity is clearly seen in the description in Japanese Patent application Laying Open No. 56-149328 (1981) that it is required that the saturation magnetization of magnetoplumbiteferrite used as a material for the medium of magnetic recording is as large as possible.

On the other hand, as a method for producing barium ferrite particles, a method of treating an aqueous alkaline suspension containing Ba ions and Fe(III) in an autoclave as a reactor (the method is hereinafter referred to as "the autoclaving method") has been hitherto known, and by selecting the reaction conditions in the autoclaving method, barium ferrite particles precipitate. The thus precipitated particles are hexagonal plate-like particles, and the distribution of the particle size and the average size of the particles differ according to the reaction conditions resulting in the difference of the magnetic properties of the particles. In the technical field of producing plate-like barium ferrite particles for use in magnetic recording by means of the autoclaving method, not only the method of formation of the product from an aqueous solution but also the method of formation of the product from a fluid has been hitherto tried.

However, in the case of the method of formation of the product from a fluid, it is necessary to carry out the autoclaving treatment at a temperature of higher than 400° C.

On the other hand, a technique by which non-ferromagnetic barium ferrite particles are formed from an aqueous solution according to the autoclaving method and the thus obtained non-ferromagnetic barium ferrite particles are sintered at a high temperature to obtain ferromagnetic barium ferrite particles has been tried.

In consideration of the above-mentioned process, in order to effectively reduce the coercive force without remarkably reducing of the value of magnetization of the magnetic particles by substituting a part of Fe(III) in barium ferrite particles with a divalent metal, M(II) and Ti(IV), the present inventors have repeated the systematic investigation on the relationship between conditions in the formation of various plate-like barium ferrite particles from an aqueous suspension by autoclaving the aqueous suspension containing both the particles represented by the formula, $Fe_{12-x-y}M_xTi_yO_{16}$, having a spinel crystalline structure and barium ions while variously changing the condition in formation thereof such as the atomic ratio of M(II) and Ti(IV) to Fe(III), the atomic ratio of Ba to Fe(III), M(II) and Ti(IV), the particle size of the ferrite particles, the concentration of alkali in the aqueous alkaline suspension, the reaction temperature of autoclaving method, the reaction time and the stirring condition of the aqueous suspension, and have studied the process for directly producing the plate-like barium ferrite particles represented by the formula (I) from the aqueous suspension by autoclaving the aqueous highly alkaline suspension, and as a result, the present inventors have found that the magnetic properties of the thus obtained plate-like barium ferrite particles were in close relationship to the composition of the particle, the particle shape, the average particle size and the particle size distribution.

Namely, it has been found by the present inventors' study that in the case of autoclaving an aqueous highly alkaline suspension containing both the particles represented by the formula:

$$Fe_{12-x-y}M_xTi_yO_{16}$$

wherein x and y are respectively 0.3 to 1.2 and M is a divalent metal selected from the group consisting of Co, Ni, Zn and Mn, having a spinel crystalline structure and an average particle size of less than 0.1 μm, and Ba ions at a temperature of 250° to 330° C. so that the atomic ratio of Ba to total amount of metals is in a range of from 1:8 to 1:10, plate-like barium ferrite particles represented by the formula (I):

$$BaFe_{12-x-y}M_xTi_yO_{19} \quad (I)$$

wherein x and y are respectively 0.3 to 1.2 and M is divalent metal selected from the group consisting of Co, Ni, Zn and Mn, showing a magnetization of larger than 35 emu/g in a magnetic field of 10 KOe, a coercive force of 500 to 1000 Oe, for magnetic recording are directly formed, and based on the finding, the present invention has been attained.

SUMMARY OF THE INVENTION

In an aspect of the present invention, there is provided a process for production of plate-like barium ferrite particles represented by the formula (I):

$$BaFe_{12-x-y}M_xTi_yO_{19} \quad (I)$$

wherein x and y are respectively 0.3 to 1.2 and M is a divalent metal selected from the group consisting of Co, Ni, Zn and Mn for magnetic recording, which comprises autoclaving an aqueous highly alkaline suspension containing particles represented by the formula: $Fe_{12-x-y}M_xTi_yO_{16}$, wherein x, y and M are respectively the same as defined above, having a spinel crystalline structure and an average particle size of less than 0.1 μm and Ba ions at a temperature in the range of from 250° to 330° C. so that the atomic ratio of Ba to total amount of the metals is in a range of from 1:8 to 1:10.

DETAILED DESCRIPTION OF THE INVENTION

According to the process of the present invention, plate-like barium ferrite particles represented by the formula:

$$BaFe_{12-x-y}M_xTi_yO_{19}$$

wherein x and y are respectively 0.3 to 1.2 and preferably x is equal to y, and M is a divalent metal selected from the group consisting of Co, Ni, Zn and Mn, are directly produced by autoclaving an aqueous highly alkaline suspension containing particles represented by the formula: $Fe_{12-x-y}M_xTi_yO_{16}$, wherein x, y and M are the same as defined above, having a spinel crystalline structure and an average particle size of less than 0.1 μm and Ba ions at a temperature in the range of from 250° to 330° C. so that the atomic ratio of Ba to total amount of the metals is in the range of from 1:8 to 1:10.

The particles as the starting material of the present invention represented by the formula: $Fe_{12-x-y}M_xTi_yO_{16}$ wherein x and y are respectively 0.3 to 1.2 and M is a divalent metal selected from the group consisting of Co, Ni, Zn and Mn, having a spinel crystalline structure and an average particle size of less than 0.1 μm can be obtained, for instance, by the following process.

An aqueous alkaline suspension of Fe(II), containing Ti(IV) and Co, Ni, Zn or Mn as the divalent metal: M(II), wherein the atomic ratio of M(II) to Fe(II) is less than 0.125, is oxidized by blowing an oxygen-containing gas therethrough at a range of from 60° to 90° C. at which a spinel ferromagnetic precipitate is formed, and the thus formed ferromagnetic precipitate of black in colour is autoclaved in the presence of a salt of nitric acid, thereby obtaining spinel ferromagnetic particles of light brown in colour as the starting material of the present invention. Alternatively, the above-mentioned ferromagnetic precipitate of black in colour is separated from the mother liquor and washed with water drying and oxidizing in air at a temperature of lower than 400° C. while preventing the formation of α-Fe₂O₃ therefrom, spinel ferromagnetic particles of light brown in colour as the same starting material of the present invention is obtained.

It is necessary that the average particle size of the spinel crystalline particles represented by the formula: $Fe_{12-x-y}M_xTi_yO_{16}$ wherein x, y and M are the same as defined above is less than 0.1 micrometer, and the average particle size depends on the reaction conditions of the wet-method oxidation, namely, the concentration of the metal ions in the aqueous suspension, pH of the aqueous suspension, the reaction temperature and the oxidation velocity of Fe(OH)₂. In the case where the average particle size of the spinel crystalline particles as the starting material of the present invention is over 0.1 μm, the objective product of the present invention, represented by the formula (I) is contaminated by α-Fe₂O₃.

As Fe(II) in the present invention, ferrous hydroxide, ferrous chloride, ferrous nitrate and ferrous sulfate may be used.

As Ba ions in the present invention, barium hydroxide, barium oxide, barium nitrate and barium chlolide may be used.

As Co(II) in the present invention, cobalt nitrate, cobalt chloride and cobalt sulfate may be used.

As Ti(IV) in the present invention, titanium chloride, alkali titanate and titanium sulfate may be used.

As to Ni(II) in the present invention, nickel chloride, nickel nitrate and nickel sulfate may be used.

As to Zn(II) in the present invention, zinc nitrate, zinc chloride and zinc sulfate may be used.

As to Mn(II) in the present invention, manganese nitrate, manganese chloride and manganese sulfate may be used.

The autoclaving treatment of the present invention may be carried out at any temperature which is lower than the critical temperature of the aqueous solution, and particularly the reaction temperature of 250° to 330° C. is suitable for an economic production of the ferrite.

The atomic ratio of Ba to the total amount of metals in the spinel-type crystalline particles represented by the formula $Fe_{12-x-y}M_xTi_yO_{16}$ wherein x, y and M are the same as defined above is in a range from 1:8 to 1:10. In the case of autoclaving at a higher temperature in a range of from 250° to 330° C. and a higher pH and in the case where x and y respectively are in the vicinity of 1.2, the atomic ratio is preferably in the vicinity of 10:1.

The plate-like barium ferrite particles produced by the procedures according to the present invention exhibit the following properties.

Namely, according to the process of the present invention, the plate-like barium ferrite particles represented by the formula:

$$BaFe_{12-x-y}M_xTi_yO_{19}$$

wherein x, y and M are respectively the same as defined above, which are favorable in dispersibility and show magnetization of larger than 35 emu/g in the magnetic field of 10 KOe and coercive force of 300 to 1000 Oe, preferably 500 to 1000 Oe, are obtained, and such plate-like barium ferrite particles are suitable as the magnetic material for magnetic recording now being demanded, particularly as the magnetic material for perpendicular magnetic recording.

The present invention will be explained more in detail while referring to the following non-limitative Examples and Comparative Examples.

Further, the value of specific surface area means that the value is obtained by the BET method, the value of magnetization is measured in the magnetic field of 10 KOe, and the coercive force is measured at a packing density of 1.6 g/cm³.

EXAMPLE 1

(1) Production of the spinel particles represented by the formula $Fe_{11.4}Co_{0.3}Ti_{0.3}O_{16}$ Into 30 liters of an aqueous alkaline suspension containing 7.0 mols of $FeSO_4.7H_2O$, 0.179 mol of $CoSO_4.7H_2O$, 0.179 mol of $TiOSO_4$ and 16 mols of NaOH at 65° C., air was blown at a rate of 35 liters/min for 20 hours, thereby completely oxidizing $Fe(OH)_2$ in the aqueous suspension. After collecting the thus formed ferromagnetic precipitate of black in colour by filtration, washing thereof with water and then treating the thus obtained precipitate with acetone, the thus treated precipitate was dried at 100° C. and then heated in atomosphere at 190° C. to obtain 570 g of ferromagnetic particles of light brown in colour. The thus obtained ferromagnetic light brown particles were identified as the spinel particles represented by the formula, $Fe_{11.4}Co_{0.3}Ti_{0.3}O_{16}$ as a result of fluorescent X-ray analysis and were spinel particles having particle size of 0.05 to 0.08 μm, average particle size of 0.07 μm and a specific surface area of 41.5 m²/g as the result of observation under an electronmicroscope.

(2) Production of the plate-like barium ferrite particles according to the present invention After dispersing 0.90 mol of $Ba(OH)_2.8H_2O$ and the thus obtained spinel particles represented by the formula, $Fe_{11.4}Co_{0.3}Ti_{0.3}O_{16}$ in 60.0 mols of NaOH, the thus obtained mixture was added to 10 liters of decarbonized water in an autoclave, and after heating the aqueous mixture to 270° C. the content of the autoclave was kept at the same temperature for 5 hours while mechanically stirring the mixture to form a ferromagnetic precipitate of light brown in colour.

After cooling the reaction product to room temperature, the precipitate was collected by filtration, washed well with water, treated with acetone and a part of the thus treated precipitate was dried at 150° C.

The thus obtained ferromagnetic particles of light brown in colour were identified as plate-like particles by observation under an electronmicroscope, and identified as $BaFe_{11.4}Co_{0.3}Ti_{0.3}O_{19}$ as a result of fluorescent X-ray analysis. According to vibrating sample magnetometer, magnetization was 43 emu/g in a field of 10 KOe and coercive force was 990 Oe at a packing density of 1.6 g/cm³.

EXAMPLE 2

(1) Production of the spinel particles represented by the formula $Fe_{10.4}Co_{0.8}Ti_{0.8}O_{16}$ Under the same conditions as in Example 1, 30 liters of an aqueous alkaline suspension containing 7.0 mols of $FeSO_4.7H_2O$, 0.54 mol of $CoSO_4.7H_2O$, 0.54 mol of $TiCl_4$ and 17.5 mols of NaOH were treated to obtain 625 g of ferromagnetic particles of light brown in colour. The thus obtained ferromagnetic light brown particles were identified as the spineltype particles represented by the formula $Fe_{10.4}Co_{0.8}Ti_{0.8}O_{16}$ as a result of fluorescent X-ray analysis and were spinel particles having a particle size of 0.01 to 0.03 μm, an average particle size of 0.02 μm and a specific surface area of 65 m²/g by observation under an electronmicroscope.

(2) Production of the plate-like barium ferrite particles according to the present invention After dispersing 0.90 mol of $Ba(OH)_2.8H_2O$ and the thus obtained spinel particles represented by the formula $Fe_{10.4}Co_{0.8}Ti_{0.8}O_{16}$ in 60 mols of NaOH, the thus obtained mixture was added to 10 liters of decarbonized water in an autoclave, and after heating the aqueous mixture to 300° C., the content of the autoclave was kept at the same temperature for 3 hours while mechanically stirring to form a ferromagnetic precipitate of light brown in colour.

By treating the thus obtained precipitate in the same manner as in Example 1, ferromagnetic particles of light brown in colour were obtained and the thus obtained ferromagnetic light brown particles were identified as the plate-like particles by observation under an electronmicroscope and were identified as $BaFe_{10.4}Co_{0.8}Ti_{0.8}O_{19}$ as a result of fluorescent X-ray analysis. According to vibrating sample magnetometer, magnetization was 39 emu/g in the field of 10 KOe and coercive force was 680 Oe at a packing density of 1.6 g/cm³.

COMPARATIVE EXAMPLE 1

Autoclaving treatment was carried out in the same manner as in Example 1 except for using the spinel particles represented by the formula $Fe_{11.4}Co_{0.3}Ti_{0.3}O_{16}$ having an average particle size of 0.2 μm to obtain the particles.

As a result of X-ray diffraction analysis, the thus obtained particles consisted of the barium ferrite particles and particles of $\alpha$-$Fe_2O_3$.

What is claimed is:

1. A process for production of plate-like barium ferrite particles represented by the formula (I):

$$BaFe_{12-x-y}M_xTi_yO_{19} \quad (I)$$

wherein x and y are respectively 0.3 to 1.2 and M is a divalent metal selected from the group consisting of Co, Ni, Zn and Mn for magnetic recording, free of $\alpha$-$Fe_2O_3$ exhibiting a magnetization of larger than 35 emu/gram in a magnetic field of 10 KOe and a coercive field of 500–1000 Oe, which comprises forming an aqueous highly alkaline suspension of particles represented by the formula: $Fe_{12-x-y}M_xTi_yO_{16}$, wherein x, y and M are respectively the same as defined above, having a spinel crystalline structure and an average particle size of less than 0.1 μm and Ba ions where the atomic ratio of Ba to the total amount of the metals in said particles of spinel crystalline structure is in the range of from 1:8 to 1:10 and autoclaving said suspension at a temperature in the range from 250°–330° C. to form said plate-like barium ferrite particles.

2. A process according to claim 1, wherein the source of Ba ions is barium hydroxide, barium oxide, barium nitrate or barium chloride.

3. A process according to claim 1, wherein x is equal to y.

* * * * *